Oct. 23, 1956

E. W. PERKINS 2,767,587

SAMPLING DEVICE

Filed July 22, 1954

INVENTOR.
EDWARD W. PERKINS

BY James B. Christie

ATTORNEY

United States Patent Office 2,767,587
Patented Oct. 23, 1956

2,767,587

SAMPLING DEVICE

Edward W. Perkins, Rochester, N. Y., assignor, by mesne assignments, to Consolidated Electrodynamics Corporation, Pasadena, Calif., a corporation of California Application July 22, 1954, Serial No. 445,091

5 Claims. (Cl. 73—421.5)

The present invention relates to sampling apparatus for taking a sample from within a closed container with minimum contamination of the sample by the medium surrounding the container.

In many types of processes conducted in a closed container, it is desirable to take a sample from within the container without interfering with the process and with a minimum amount of sample contamination by whatever surrounds the container. For example, in high vacuum processes in which a container encloses a high vacuum system, it is sometimes necessary to check the container during the process of evacuation to determine if any leaks are present. A common method for checking for leaks in a vacuum system consists of surrounding the area suspected of leaking with a tracer, usually a gas such as helium. If a leak is present in the suspected area, the tracer gas is pulled into the evacuated container. A gas sample is then removed from within the container and analyzed to determine whether or not the tracer gas is present within the container. The analysis for the tracer gas in the sample is commonly done with a mass spectrometer, such as that described in U. S. Patent 2,537,025 issued to C. E. Berry, which is specifically adapted to function as a leak detector for evacuated systems.

There are numerous methods for taking samples from containers, but they suffer from various disadvantages such as inflexibility, low sensitivity, or complexity of operation. In one type of conventional sampling system, a wall of the container is provided with a conduit which is permanently connected to the leak detector. A valve is disposed within the conduit for controlling the flow of gas through the conduit from the container to the leak detector and permitting a gas sample to be admitted to the leak detector as required. This method is usually satisfactory except that it has the disadvantage of inflexibility in that samples can be taken from the system only where the leak detector is permanently attached to the conduit in the container wall. Some leak detector systems use a conduit provided with valves, unions and couplings which are adapted to receive a connection from the leak detector. This method has the disadvantage that a considerable amount of atmospheric air surrounding the container is trapped in the conduit when the leak detector is attached thereto. This trapped air "dilutes" the tracer gas and seriously limits the sensitivity of the leak detector. One solution to this problem is to provide means independent of the container and leak detector for evacuating the conduit before it is opened to permit the sample from the container to enter the leak detector. This is a time-consuming operation and in many cases impractical.

The present invention overcomes the above disadvantages by providing a flexible sampling unit which can easily be moved from one part of the system to another, and which takes samples with a minimum degree of contamination, and without requiring an independent evacuating means. Although the sampling device of this invention is described below as applied to the taking of uncontaminated samples from evacuated chambers, it can also be used to take samples from containers under any pressure.

The invention contemplates a sampling device comprising a probe unit and receiver unit. The receiver unit is basically a conduit affixed in a wall of a container. A receiver valve is disposed within the receiver conduit and is adapted to be opened and closed to permit access to the container interior. The end of the receiver conduit remote from the container wall is provided with a sealing surface which encircles the exposed end of the receiver valve and is adapted to receive a matching sealing surface on the probe unit. The probe unit comprises a probe conduit and a probe valve disposed within the conduit. One end of the conduit is provided with the sealing surface mentioned above which seals against the receiver conduit sealing surface when the probe and receiver units are brought into sampling position. The exposed end surfaces of the valves and the conduits are provided with matching surfaces which fit together so that there is substantially no free space trapped within the seal made by the two sealing surfaces when the probe and receiver conduits are in sampling position. Means is provided for opening the two valves when the two conduits are in sealing relation so that the two conduits may be interconnected.

In a preferred form, each of the valves is respectively slidably disposed within its conduit and is provided with springing means for urging each valve into its respective closed position. The valves are arranged so that the operation of the probe valve automatically operates the receiver valve. In addition, the probe conduit is provided with a bellows arrangement which seals the end of the probe conduit remote from the end with the sealing surface and permits operation of the second valve by the application of pressure exterior of the conduit. To ensure sealing between the two conduits, a gasket is used between the two sealing surfaces and aligning means is provided to facilitate proper engagement of the sealing surfaces. The probe conduit is provided with a lateral conduit adapted to be connected to the leak detector.

These and other aspects of the invention will be more clearly understood from the following detailed description taken in conjunction with the accompanying drawing in which.

Figure 1:
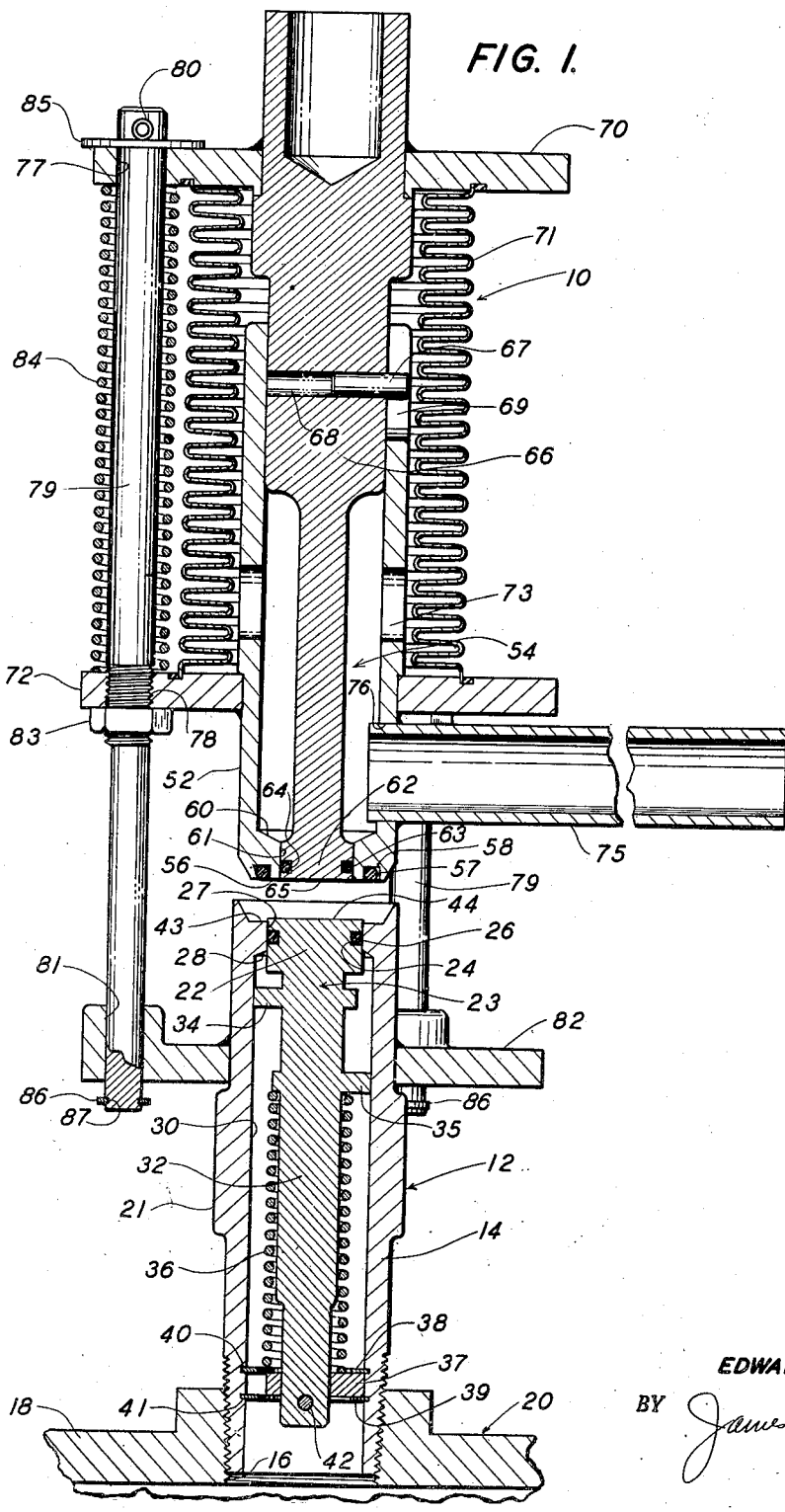
Fig. 1 is a vertical section showing a preferred form of the invention in which the probe and receiver are not in sampling position.

Referring to the drawing, the invention comprises a probe unit 10 and a receiver unit 12. The receiver unit comprises a cylindrical receiver conduit 14 having one end threadably engaged in an opening 16 in wall 18 of an evacuated container 20. An intermediate portion 21 of the conduit exterior is hexagonally shaped to facilitate installation and removal of the receiver unit. A receiver valve piston 22 of a receiver valve 23 is adapted to fit in the end of the receiver conduit remote from the container wall, and is provided with an annular groove 24 having a suitable gasket 26, e. g., an O ring, disposed in it to make a sliding seal against the interior wall 27 of the outer end of the conduit. The interior of the conduit is tapered at 28 near its outer end remote from the container wall to an enlarged bore 30 which is substantially larger than the valve piston diameter.

A valve stem 32 formed integrally with the valve piston extends inwardly along the axis of the receiver conduit. A first spider 34 is formed integrally with the valve stem near the valve piston. The spider is in the form of an equilateral triangle coaxially disposed about the valve stem axis and extending at right angles thereto. Each apex of the triangular spider is rounded to fit and slide against the inner surface of the conduit. A second spider 35 is formed integrally with the valve stem intermediate the first spider and the midpoint of the valve stem. The second spider is identical with the first and cooperates with it to maintain the valve stem in proper alignment as the valve is operated. One end of a compression spring 36 coaxially disposed around the portion of the valve stem interior of the second spider bears against the inner surface of the second spider. The other end of the spring bears against the surface of a triangular-shaped washer 37 which is held within the conduit by two C-washers 38, 39, respectively fitted in grooves 40, 41 provided in the conduit wall on each side of the triangular washer. Thus, the receiver valve is urged into an outward and closed position. A stop pin 42 extending transversely through the valve stem at its innermost end limits the upward travel of the stem by engaging the inner surface of the triangular washer. The triangular shape of the two spiders and the washer conveniently provides passageway along the interior of the receiver conduit.

A smooth sealing surface 43 is formed at the end of the receiver conduit remote from the container wall. The sealing surface can take any of a large number of forms, the presently preferred receiver conduit surface being recessed or dish-shaped and having a flat bottom portion. The exterior surface 44 of the valve is also provided with a smooth finish and protrudes slightly above the receiver conduit sealing surface when the spring urges the receiver valve into the closed position.

The probe unit comprises a probe conduit 52 having approximately substantially the same outside diameter as the receiver conduit. A sample chamber 54 is formed within the probe conduit. The exterior probe conduit is tapered at its lower end to a flat smooth sealing surface 56 adapted to fit against the corresponding sealing surface on the receiver conduit when the probe conduit is fitted into the recessed, outer end of the receiver conduit. To facilitate sealing, an annular gasket or O ring 57 is disposed in an annular groove 58 in the probe conduit sealing surface. The inside diameter of the probe conduit interior is tapered at 60 near its lower end to a bore 61 of reduced diameter. A probe valve piston 62 slides within the bore 61. An annular gasket or O ring 63 is disposed in an annular groove 64 formed in the side wall of the valve piston and seals against the reduced bore. The exterior surface 65 of the valve is smooth and is substantially flush with the sealing surface of the probe conduit when the valve is in its closed position.

A push rod 66, formed integrally with the valve piston, slides within and projects from the upper portion of the probe conduit. The diameter of the upper part of the rod is slightly less than the I. D. of the probe conduit so that proper alignment is maintained as the rod slides within the conduit. A stop pin 67 press fitted into a bore 68 in the upper end of the push rod and extending transversely to the push rod axis travels in a vertical slot 69 provided in the upper part of the probe conduit and limits the lower travel of the push rod. An exterior annular rod flange 70 is sealed to the portion of the rod projecting from the probe conduit. The upper end of a tubular bellows 71 is sealed onto the annular flange periphery and the lower end of the bellows is sealed to an intermediate portion of an exterior annular probe conduit flange 72 provided on the probe conduit. A bore 73 is provided through the probe conduit wall above the flange on the conduit. The intermediate part of the push rod (i. e., the portion adjacent bore 73) is of reduced diameter to provide a relatively large passageway from the lower end of the probe conduit, through the bore 73, and into the bellows. This permits rapid degassing of the sample chamber formed by the bellows, rod, and probe conduit arrangement. A lateral conduit 75 attached to an opening 76 in the probe conduit wall is adapted to be connected to any type of conventional leak detector, for example a mass spectrometer (not shown).

Three bores 77 spaced 120° apart are provided in the rod flange periphery. Three matching threaded holes 78 are provided in the probe conduit flange periphery. Three tie rods 79 are disposed respectively through the bores. Each of the tie rods is provided with a stop pin 80 extending transversely through the upper end of the respective tie rods. The lower end of each tie rod respectively extends through three bores 81 in the periphery of a flange 82 attached to the receiver unit above the hexagonally-shaped portion. The intermediate part of each tie rod is threaded and held in place to the flange 72 by a lock nut 83. A compression spring 84 is respectively disposed around each of the tie rods and urges the push rod in upward direction. Each tie rod stop pin limits the upper travel of the push rod by seating respectively against a washer 85 disposed around each tie rod above the rod flange. A C-washer 86 is releasably mounted in a groove 87 in the lower end of each tie rod. The C-washers are removed to permit engagement and disengagement of the probe and receiver units, or they may be eliminated altogether if the probe unit is to be moved continuously from one receiving unit to another.

Figure 2:
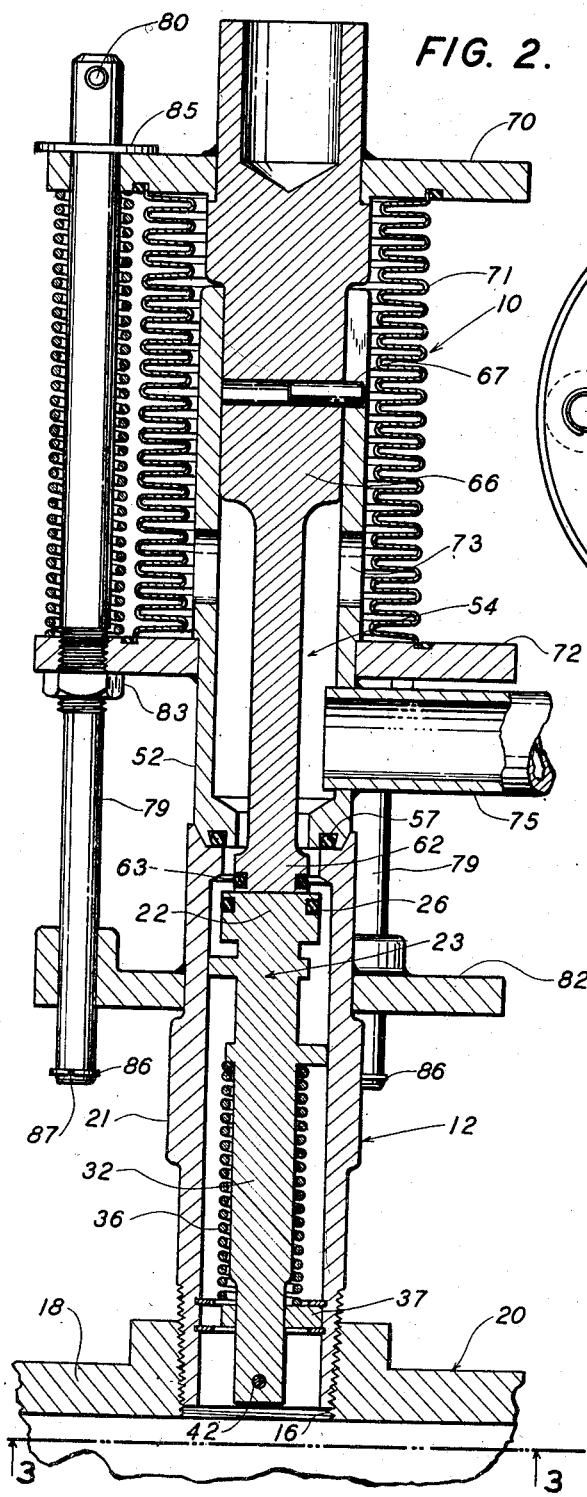
Fig. 2 is a vertical section showing the probe and receiver units in sampling position.
Figure 3:
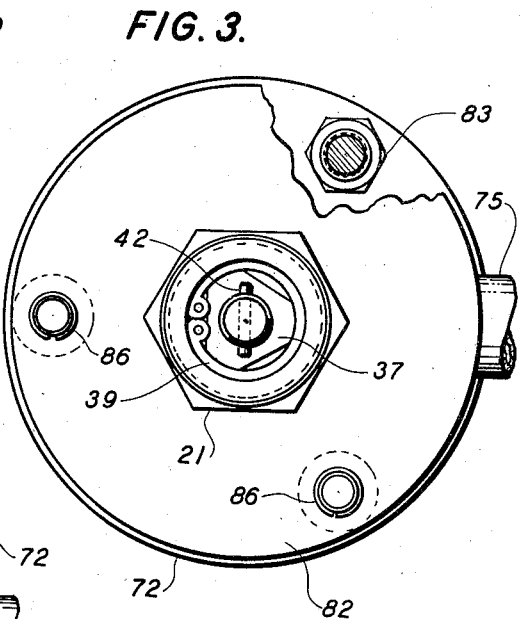
Fig. 3 is a bottom view partly broken away, taken along line 3—3 of Fig. 2, with the container wall not shown.

The operation of the sampling device is shown most clearly in Fig. 2, in which the probe unit and the receiver unit are shown in sampling position. When the sealing surfaces of the probe and receiver conduits are brought into contact, the exterior valve surfaces make similar contact. Thus when the O ring 57 seals the two conduits, the probe and receiver units are in close contact with substantially none of the medium (usually the atmosphere) surrounding the container trapped between them. Pressure is then applied to the push rod, forcing it in a downward direction. This moves the probe valve piston down against the receiver valve piston and opens both valves. The tie rods sliding in the bore in the receiver unit flange insure proper alignment of the two units. The sample chamber, which is maintained under vacuum prior to the sampling, is interconnected through the receiver conduit to the evacuated container when the valves are opened. A sample of the material within the container passes through the receiver conduit to the sample chamber and then to the mass spectrometer. Once sufficient sample has been obtained, the pressure is released from the probe valve rod and the two compression springs push the two valves into their closed positions. The probe unit may then be removed from the receiver unit and used to take another sample, in a different location, as may be required.

Although the specific embodiment illustrated shows the sample being conveyed directly to the leak detector as the sample is taken, the lateral conduit may be omitted or closed and the sample stored within the sample chamber. The sample can then be carried to a central location where it may be discharged into an evacuated container which is connected to a mass spectrometer, and is equipped with a receiver unit of the type described above.

In addition to providing a flexible and simple method for taking uncontaminated sample without requiring an extra evacuating system, the sampling device automatically closes itself, which avoids the possibility of inadvertently admitting excessive pressure into the leak detector. This is particularly important when the leak detector is of the mass spectrometer type because serious and expensive damage can be incurred if large quantities of gas are suddenly introduced into an operating mass spectrometer.

I claim:

1. In a device for taking a sample from a container having a wall, the combination comprising a receiver conduit attached to an opening in the wall, the outer end of the receiver conduit being provided with a first sealing surface, a receiver valve piston disposed in the receiver conduit, the inner surface of the outer end of the receiver conduit being provided with a seat for the receiver valve piston, springing means urging the receiver valve piston toward its seat, a probe conduit having a second sealing surface at one end of the probe conduit and adapted to seal releasably against the first sealing surface, a probe valve piston disposed in the end of the probe conduit adjacent the second sealing surface, the inner surface of the end of the probe conduit adjacent the second sealing surface being provided with a seat for the probe valve piston, springing means urging the probe valve piston toward its seat, the two valve pistons being seated on their respective seats when the two sealing surfaces are out of sealing relationship and the valve pistons being disposed to engage each other when the two sealing surfaces are brought into sealing relation, and means for removing the two valve pistons from their respective seats while the sealing surfaces are in contact so that the two conduits are interconnected.

2. In a device for taking a sample from a container having a wall, the combination comprising a receiver conduit attached to an opening in the wall, the outer end of the receiver conduit being provided with a first sealing surface, a receiver valve stem having a head thereon slidably disposed in the receiver conduit, the inner surface of the outer end of the receiver conduit being provided with a seat for the receiver head, a probe conduit having a second sealing surface at one end of the probe conduit and adapted to seal releasably against the first sealing surface, a probe valve stem having a head thereon slidably disposed in the end of the probe conduit adjacent the second sealing surface, the inner surface of the end of the probe conduit adjacent the second sealing surface being provided with a seat for the probe valve piston, the two valve heads being seated on their respective seats when the two sealing surfaces are out of sealing relationship and the two valve heads being disposed to engage each other when the two sealing surfaces are brought into sealing relation, and means for removing the two valve heads from their respective seats while the sealing surfaces are in contact so that the two conduits are interconnected.

3. In a device for taking a sample from a container having a wall, the combination comprising a receiver conduit attached to an opening in the wall, the outer end of the receiver conduit being provided with a first sealing surface, a receiver valve piston disposed in the receiver conduit, the inner surface of the outer end of the receiver conduit being provided with a seat for the receiver valve piston, a probe conduit having a second sealing surface at one end of the probe conduit and adapted to seal releasably against the first sealing surface, a probe valve piston disposed in the end of the probe conduit adjacent the second sealing surface, the inner surface of the end of the probe conduit adjacent the second sealing surface being provided with a seat for the probe valve piston, the two valve pistons being seated on their respective seats when the two sealing surfaces are out of sealing relationship and the valve pistons being disposed to engage each other when the two sealing surfaces are brought into sealing relation, and a push rod attached to the probe valve piston and extending out of the probe conduit remote from the second sealing surface, and a bellows sealed to the push rod and to the probe conduit to form a flexible seal between the push rod and the conduit.

4. In a device for taking a sample from a container having a wall, the combination comprising a receiver conduit attached to an opening in the wall, the outer end of the receiver conduit being provided with a first sealing surface, a receiver valve piston disposed in the receiver conduit and having a smooth exterior surface, the inner surface of the outer end of the receiver conduit being provided with a seat for the receiver valve piston, a probe conduit having a second sealing surface at one end of the probe conduit and adapted to seal releasably against the first sealing surface, a probe valve piston disposed in the end of the probe conduit adjacent the second sealing surface and having a smooth exterior surface which matches the exterior surface of the receiver valve piston, the inner surface of the end of the probe conduit adjacent the second sealing surface being provided with a seat for the probe valve piston, the two valve pistons being seated on their respective seats when the two sealing surfaces are out of sealing relationship and the matching valve piston surfaces being disposed to fit together when the two sealing surfaces are brought into sealing relation, and means for removing the two valve pistons from their respective seats while the sealing surfaces are in contact so that the two conduits are interconnected.

5. In a device for taking a sample from a container having a wall, the combination comprising a receiver conduit attached to an opening in the wall, the outer end of the receiver conduit being provided with a first sealing surface, a receiver valve piston disposed in the receiver conduit, the inner surface of the outer end of the receiver conduit being provided with a seat for the receiver valve piston, a probe conduit having a second sealing surface at one end of the probe conduit and adapted to seal releasably against the first sealing surface, a probe valve piston disposed in the end of the probe conduit adjacent the second sealing surface and the inner surface of the end of the probe conduit adjacent the second sealing surface being provided with a seat for the probe valve piston, the two valve pistons being seated on their respective seats when the two sealing surfaces are out of sealing relationship and the valve pistons being disposed to engage each other when the two sealing surfaces are brought into sealing relation, and means for displacing the probe valve piston away from its seat into the receiver conduit to displace the receiver valve piston away from its seat while the sealing surfaces are in contact so that the two conduits are interconnected.

References Cited in the file of this patent

UNITED STATES PATENTS

| | | |
|---|---|---|
| 1,459,100 | Henning | June 19, 1923 |
| 2,370,260 | Robison | Feb. 27, 1945 |
| 2,558,387 | Ray | June 26, 1951 |